US007856575B2

(12) United States Patent
Bock et al.

(10) Patent No.: US 7,856,575 B2
(45) Date of Patent: Dec. 21, 2010

(54) COLLABORATIVE TROUBLESHOOTING COMPUTER SYSTEMS USING FAULT TREE ANALYSIS

(75) Inventors: Megan Elena Bock, San Jose, CA (US); Randall William Horman, Toronto (CA); Holger Karn, Aidlingen (DE); Kevin Michael McBride, Mountain View, CA (US); Matthew Wayne Novak, San Jose, CA (US); Peter Wansch, San Jose, CA (US); Yongchun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 400 days.

(21) Appl. No.: 11/925,425

(22) Filed: Oct. 26, 2007

(65) Prior Publication Data

US 2009/0113248 A1    Apr. 30, 2009

(51) Int. Cl.
*G06F 11/00* (2006.01)
(52) U.S. Cl. .............................. 714/26; 714/48; 714/57
(58) Field of Classification Search .................. 714/26, 714/48, 57
See application file for complete search history.

(56) References Cited

U.S. PATENT DOCUMENTS

| 7,191,364 | B2  |   | 3/2007  | Hudson et al. |
| 7,200,525 | B1  | * | 4/2007  | Williams et al. ............ 702/185 |
| 7,203,624 | B2  |   | 4/2007  | Warshawsky |
| 7,203,881 | B1  | * | 4/2007  | Williams et al. ............ 714/741 |
| 7,281,170 | B2  | * | 10/2007 | Taylor et al. ................... 714/48 |
| 7,379,846 | B1  | * | 5/2008  | Williams et al. ............ 702/185 |
| 7,500,143 | B2  | * | 3/2009  | Buia et al. ..................... 714/26 |
| 7,516,025 | B1  | * | 4/2009  | Williams et al. .............. 702/57 |
| 2004/0078683 | A1 | * | 4/2004 | Buia et al. ..................... 714/37 |
| 2004/0187048 | A1 |   | 9/2004 | Angamuthu et al. |
| 2005/0086195 | A1 |   | 4/2005 | Tan et al. |
| 2005/0278273 | A1 |   | 12/2005 | Uthe |
| 2006/0117059 | A1 |   | 6/2006 | Freeman, Jr. et al. |

OTHER PUBLICATIONS

Bernhard Kaiser et al., "A New Component Concept for Fault Trees", vol. 33 SCS'03, Oct. 2003, pp. 37-46.
Cox et al., "Input/Output Event Analysis", IBM Technical Disclosure Bulletin, vol. 40, No. 7, Jul. 1997, pp. 117-128.
Klaus Julisch, "Clustering Intrusion Detection Alarms to Support Root Cause Analysis", ACM Transactions on Information and System Security, vol. 6, No. 4, Nov. 2003, pp. 443-471.

* cited by examiner

*Primary Examiner*—Robert Beausoliel
*Assistant Examiner*—Charles Ehne
(74) *Attorney, Agent, or Firm*—Patterson & Sheridan, LLP

(57) ABSTRACT

Embodiments of the invention provide techniques for troubleshooting of computer systems using a fault tree analysis. In one embodiment, data parameters describing a status of a system may be monitored to determine the existence of a fault. In the event of a fault, fault tree analysis metadata may be evaluated to attempt to determine a root cause of the fault. If a root cause can be automatically determined, it may be presented to a user in a troubleshooting console, or may be used to trigger an automated corrective action. Alternatively, if a root cause cannot be automatically determined, the user may be presented with additional fault tree analysis metadata and any relevant data parameters in the troubleshooting console, so that the user may determine the root cause of the fault event.

21 Claims, 4 Drawing Sheets

_US 7,856,575 B2_

COLLABORATIVE TROUBLESHOOTING COMPUTER SYSTEMS USING FAULT TREE ANALYSIS

BACKGROUND OF THE INVENTION

1. Field of the Invention

Embodiments of the invention generally relate to computer systems. More specifically, embodiments of the invention provide techniques for troubleshooting computer systems using fault tree analysis.

2. Description of the Related Art

Modern computing systems are complex and may include multiple software applications working as an integrated system. For example, a commercial website may be provided by multiple servers, with each server including an operating system (OS), a web server, and other software applications (e.g., a database and/or an application server).

A computing system may suffer fault events, or errors that affect the functioning of the computing system. Such fault events may be resolved by troubleshooting, referring to a process of identifying and resolving the causes of the error. However, troubleshooting fault events in a complex computing system may be a difficult and time-consuming administration task. Further, if a fault causes the computing system to be unavailable, the time required to correct the fault may lead to interruption of critical functions of an organization (e.g., a temporary shut-down of a business, government agency, etc.). In such cases, a system administrator may seek to rapidly restore the computing system by applying a tactical solution that addresses the symptoms of the fault. However, if the root causes of the fault are not addressed, the fault may cause the system to fail again. One technique for identifying root causes of system faults is fault tree analysis (FTA). As is known in the art, FTA is a technique of applying expert knowledge in successive refinement for determining a root cause.

SUMMARY OF THE INVENTION

Embodiments of the invention provide techniques for troubleshooting computer systems using a fault tree analysis. One embodiment of the invention provides a method for troubleshooting a computer system, comprising: detecting a fault event in the computer system, wherein the computer system is executing at least one software application; retrieving a fault tree analysis describing the fault event, wherein the fault tree analysis specifies a hierarchical structure specifying one or more symptoms associated with the detected fault event and one or more root causes associated with the detected fault event; retrieving one or more data values describing an operational status of the computer system; determining, based on the fault tree analysis and the one or more data values, a predicted root cause for the fault event; and presenting the predicted root cause on a user interface.

Another embodiment of the invention provides a computer-readable storage medium containing a program which, when executed, performs an operation. The operation comprises: retrieving a fault tree analysis describing the fault event, wherein the fault tree analysis specifies a hierarchical structure specifying one or more symptoms associated with the detected fault event and one or more root causes associated with the detected fault event; retrieving one or more data values describing an operational status of the computer system; determining, based on the fault tree analysis and the one or more data values, a predicted root cause for the fault event; and presenting the predicted root cause on a user interface.

Yet another embodiment of the invention provides a system, comprising: a processor; and a memory containing a program configured for troubleshooting a computer system by performing an operation. The program is configured to: retrieve a fault tree analysis describing the fault event, wherein the fault tree analysis specifies a hierarchical structure specifying one or more symptoms associated with the detected fault event and one or more root causes associated with the detected fault event; retrieve one or more data values describing an operational status of the computer system; determine, based on the fault tree analysis and the one or more data values, a predicted root cause for the fault event; and present the predicted root cause on a user interface.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
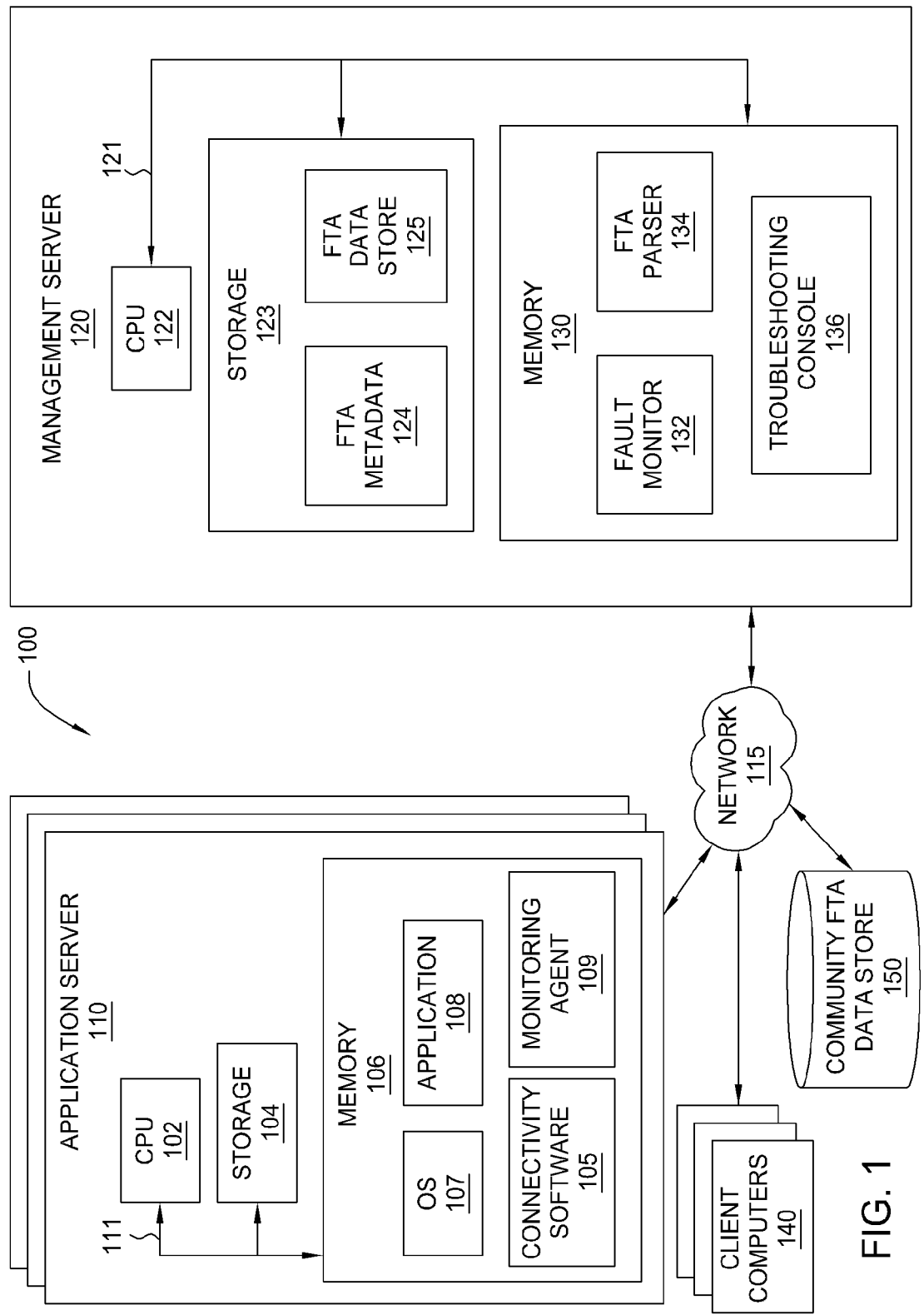
FIG. 1 illustrates an exemplary computing system, according to one embodiment of the invention.

One technique for identifying root causes of system faults is fault tree analysis (FTA). Generally, FTA is used to determine a root cause for a fault event, and involves backward reasoning through successive refinements from general to specific. As a deductive methodology, FTA examines preceding events leading to failure in a time-driven relational sequencing. The top of a fault tree starts with a fault event (hereafter referred to as a "top event") representing the occurrence of a symptom and decomposes it into intermediate events and their relationships until the basic events (root causes) are identified. As used herein, the various events included in the fault tree may be referred to as "nodes" of the fault tree. The resulting fault tree represents of the potential combinations of failures that generated the fault event.

Embodiments of the invention provide techniques for troubleshooting of computer systems using FTA. In one embodiment, data parameters describing a status of a system may be monitored to determine the existence of a fault. In the event of a fault, FTA metadata may be evaluated to attempt to determine a root cause of the fault. If a root cause can be determined, such cause may be presented to a user in a troubleshooting console, or may be used to trigger an automated corrective action. Alternatively, if a root cause cannot be determined, the user may be presented with additional FTA metadata and any relevant data parameters in the troubleshooting console, to assist the user in determining the root cause of the fault event. The FTA metadata may be generated by a supplier of software included in the computer system, by an organization owning the computer system, or by a community of users sharing FTA information.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., writable DVDs, RW-CDs, and hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 is a block diagram that illustrates a client server view of computing environment 100, according to one embodiment of the invention. As shown, computing environment 100 includes application servers 110, client computers 140, a management server 120, a community fault tree analysis (FTA) a data store 150, and network 115. In one embodiment, the computer systems illustrated in environment 100 may include existing computer systems, e.g., desktop computers, server computers, laptop computers, tablet computers, and the like. The computing environment 100 illustrated in FIG. 1, however, is merely an example of one computing environment. Embodiments of the present invention may be implemented using other environments, regardless of whether the computer systems are complex multi-user computing systems, such as a cluster of individual computers connected by a high-speed network, single-user workstations, or network appliances lacking non-volatile storage. Further, the software applications illustrated in FIG. 1 and described herein may be implemented using computer software applications executing on existing computer systems, e.g., desktop computers, server computers, laptop computers, tablet computers, and the like. However, the software applications described herein are not limited to any currently existing computing environment or programming language, and may be adapted to take advantage of new computing systems as they become available.

As shown, each application server 110 may include a central processing unit (CPU) 102, which obtains instructions and data via a bus 111 from memory 106 and storage 104. CPU 102 is a programmable logic device that performs all the instruction, logic, and mathematical processing in a computer. Storage 104 stores application programs and data for use by application server 110. Storage 104 includes hard-disk drives, flash memory devices, optical media and the like. Application server 110 may be operably connected to the network 115, which generally represents any kind of data communications network. Accordingly, the network 115 may represent both local and wide area networks, including the Internet. In addition, each client computer 140 may include a CPU, memory, and storage components. However, for the sake of brevity, the components of client computers 140 are not illustrated in FIG. 1.

In one embodiment, memory 106 includes an operating system (OS) 107, application 108, connectivity software 105 and a monitoring agent 109. Operating system 107 is the software used for managing the operation of the application server 110. Examples of OS 107 include UNIX, a version of the Microsoft Windows® operating system, and distributions of the Linux® operating system. (Note, Linux is a trademark of Linus Torvalds in the United States and other countries). Application 108 represents any useful software program. For example, application 108 may represent a relational database and/or application server. Connectivity software 105 provides connectivity to enable remote users of client computers 140 to access application 108. For example, connectivity software 105 may be an HTTP server. Monitoring agent 109 represents a software program configured to monitoring the status of application server 110 and/or its software applications.

In one embodiment, management server 120 may be configured to detect faults occurring in application servers 110. More specifically, management server 120 may receive (or send) data signals from (or to) application servers 110 over the network 115, and may use those data signals (or responses) to detect a fault in application server 110. Management server 120 may also be configured to enable users to troubleshoot any faults detected in application server 110. As shown, management server 120 includes a CPU 122, which obtains instructions and data via a bus 121 from storage 123 and memory 130. CPU 122 could be any processor adapted to support the methods of the invention. Memory 126 is any memory sufficiently large to hold the necessary programs and data structures. Memory 126 could be one or a combination of memory devices, including random access memory, nonvolatile or backup memory, (e.g., programmable or flash memories, read-only memories, etc.). Management server 120 may be operably connected to the network 115.

In one embodiment, storage 123 may include fault tree analysis (FTA) metadata 124 and FTA data store 125. FTA metadata 124 represents a data structure describing a fault tree analysis of application server 110. In other words, FTA metadata 124 may include expert knowledge for troubleshooting the application server 110. For example, FTA metadata 124 may include data describing a fault tree like fault tree 200 illustrated in FIG. 2 (described in greater detail below). In one embodiment, FTA metadata 124 may be configured for troubleshooting the application 108. In such a case, FTA metadata 124 may be provided by a company supplying the application 108. In another embodiment, FTA metadata 124 may be configured for troubleshooting application server 110 as a whole, and may be provided by a consultant or system integrator that may have configured application server 110. That is, FTA metadata 124 may be configured for troubleshooting a system including the particular collection of software components present on application server 110. Such software components may include independent applications that may be integrated in a single system. In yet another embodiment, FTA metadata 124 may be created and/or modified by an administrator or business user of application server 110.

In one embodiment, FTA metadata 124 may be composed according to an XML schema. In particular, FTA metadata 124 may be composed using the publicly available Darwin Information Typing Architecture (DITA), which is an XML-based architecture for authoring, producing, and delivering topic-based technical information. Note that FTA metadata 124 may also be stored using other techniques, for example in relational databases, text data files, and the like.

In one embodiment, FTA data store 125 may store data used in evaluating the FTA metadata 124. More specifically, FTA data store 125 may include data parameters (and associated values) collected by monitoring agents 109, and which may describe a status of an application server 110. Such data parameters may be used to detect the occurrence of a fault event. Further, FTA data store 125 may include data parameters collected after the detection of a fault event. That is, FTA metadata 124 may specify additional data parameters which may be collected in order to determine a root cause from the nodes of the fault tree. One example of such additional data parameters is the "AUTOCOMMIT" parameter specified in root cause 250 shown in FIG. 2 (described below). Furthermore, FTA data store 125 may include user-specified FTA data, meaning FTA nodes added by a user of application server 110. Such user-specified FTA data may be used in combination with, or instead of, the FTA metadata 124. Additionally, FTA data store 125 may include any other data which may be used in troubleshooting a fault event, for example user notations, static documentation, historical records of previous fault events, and the like.

Generally, some values of the data parameters included in FTA data store 125 may be collected as close to the time of the fault event as possible, thus improving the accuracy of an evaluation of FTA metadata 124. However, in some cases, values of data parameters included in FTA data store 125 may be collected at some time after the fault event. For example, consider a database administrator that has determined a root cause for a database fault, and has determined a corrective action that requires that the database be stopped and restarted. In such a case, the administrator may wish to determine a suitable time to execute the corrective action with minimal disruption to the users of the database. Thus, the administrator may wish to view additional data values describing the current status of the system (rather than at time of failure), such as a number of users connected to the database, a number of jobs being processed, etc.

In one embodiment, community FTA data store 150 may store FTA data that is maintained and shared by a community of users. The community FTA data store 150 may include notations created by users. Generally, users participating in community FTA data store 150 may benefit by sharing expert knowledge of fault troubleshooting. In one embodiment, the FTA data used in troubleshooting may be based on a combination of FTA data stored in community FTA data store 150, FTA metadata 124, and FTA data store 125. Of course, such embodiments are provided for illustrative purposes only. Other embodiments are also considered to be within the scope of the invention.

As shown, memory 130 may include a fault monitor 132, a FTA parser 134, and a troubleshooting console 136. Fault monitor 132 represents a software application configured to receive data parameters from monitoring agents 109, and to detect the occurrence of a fault event based on the received data parameters. FTA parser 134 represents a software application configured to parse FTA metadata 124, FTA data store 125, and community FTA data store 150. FTA parser 134 may also be configured to combine data from these three FTA data files, such that they may be evaluated as a single FTA.

Figure 2:
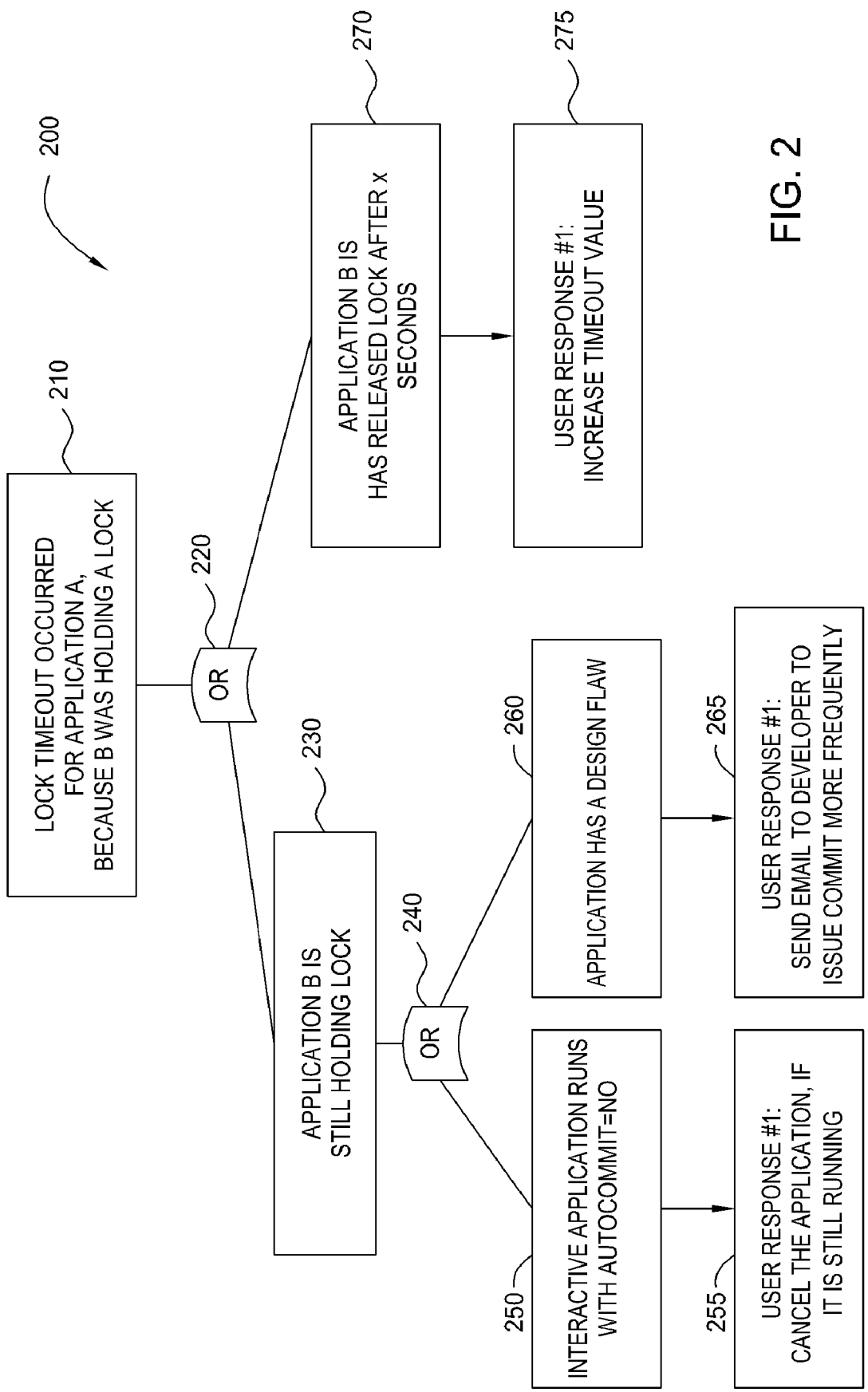
FIG. 2 illustrates a conceptual diagram of a fault tree used in a fault tree analysis, according to one embodiment of the invention.

FIG. 2 illustrates a conceptual diagram of a fault tree 200 used in an FTA, according to one embodiment of the invention. Fault tree 200 includes a top event 210, representing a fault occurring in a database. Top event 210 is preceded by intermediate event 230 and root cause 270, which are joined by a logical "OR" operator 220. In other words, top event 210 may be caused by either intermediate event 230 or root cause 270. If, in a particular instance, it is determined that the cause of the top event 210 is root cause 270, the proper corrective action is specified in the user response 275, namely to "Increase timeout value." On the other hand, if the cause determined to be the intermediate event 230, the fault tree branches at another logical "OR" operator 240, indicating that cause is either root cause 250 or root cause 260. Depending on which root cause is determined to be correct, the user may then perform one of the corrective actions specified in user responses 255 or 265.

Note that root cause 250 specifies a system parameter and a corresponding value, namely "AUTOCOMMIT=NO." Thus, to properly evaluate root cause 250, the user may wish to view the value of the application parameter "AUTOCOMMIT" at the time that the top fault 210 took place. Note also that fault tree 200 is only provided as an illustrative example, and is thus simplified for the sake of clarity. In most cases, an actual fault tree may be expected to be much larger and complex than fault tree 200.

Figure 3:
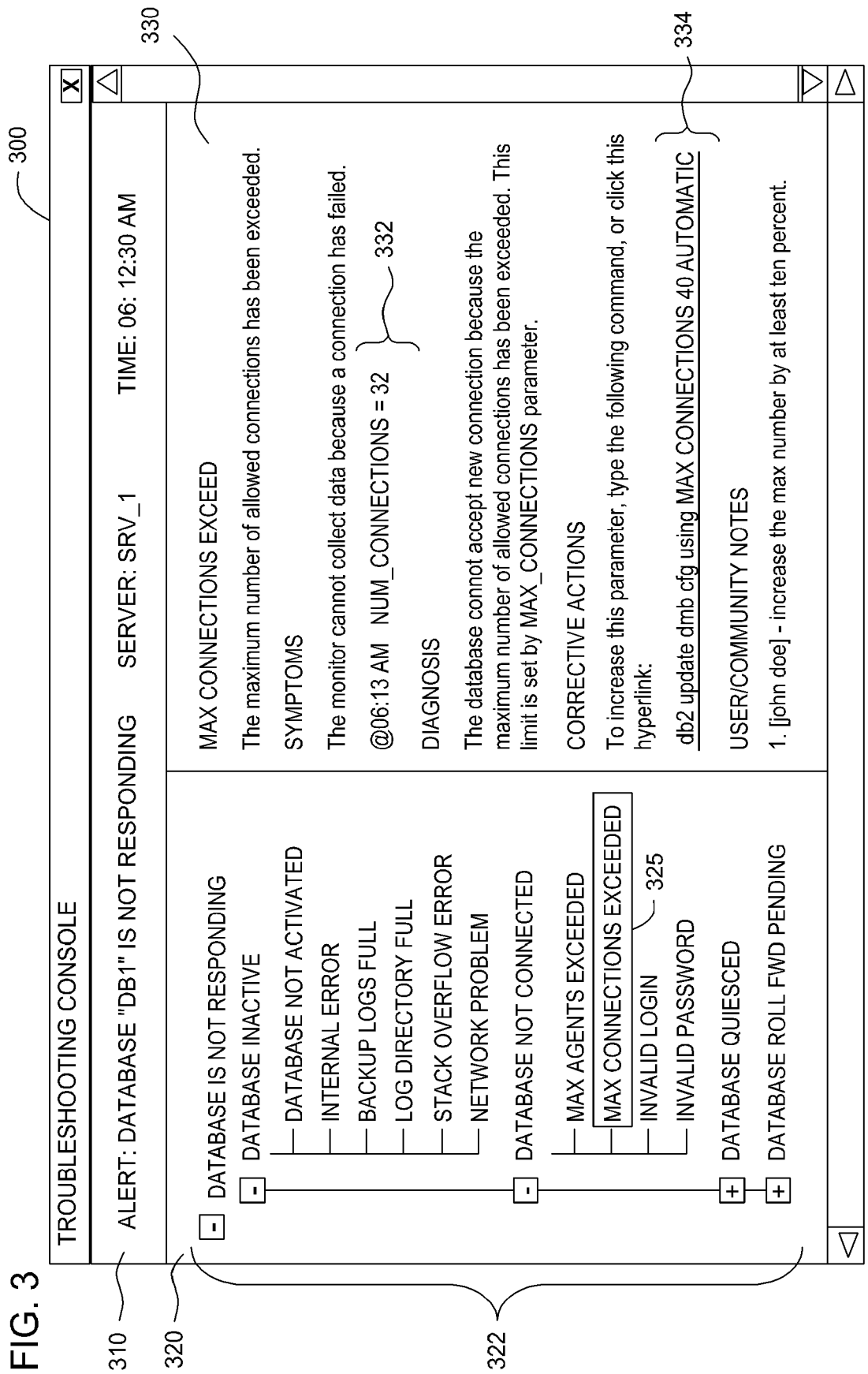
FIG. 3 illustrates an exemplary troubleshooting console, according to one embodiment of the invention.

FIG. 3 illustrates an exemplary troubleshooting console 136, according to one embodiment of the invention. Generally, troubleshooting console 136 may be configured as a workflow tool for troubleshooting fault events in application servers 110. In one embodiment, troubleshooting console 136 may be generated using FTA data stored in FTA metadata 124, FTA data store 125, and community FTA data store 150. Thus, troubleshooting console 136 may be configured to interpret the data formats used in the underlying data sources, for example XML, DITA, etc.

As shown, troubleshooting console 136 may include an alert section 310, a navigation section 320, and an instructions section 330. In one embodiment, alert section 210 may be configured to alert a user of a fault event. In this example, alert section 310 indicates that a database "DB1" located on server "SRV_1" is not responding. The user may also be notified of a fault event by other alert techniques external to the troubleshooting console 136, such as emails, pager messages, text messages, etc.

Illustratively, navigation section 320 includes a tree view 322, which may be configured according to the FTA data files. That is, the various levels of tree view 320 may correspond to the levels of a fault tree (i.e., top events, intermediate events, and root causes) included in the FTA data files. In this example, the user has selected a root cause 325 in tree view 320, labeled "MAX CONNECTIONS EXCEEDED." As a result, instructions section 330 displays instructions describing symptoms, diagnosis, and corrective actions for the selected root cause 325.

In one embodiment, troubleshooting console 136 may display data parameters useful in troubleshooting an application server 110. Such data parameters may indicate the occurrence of a fault event. For example, as illustrated in FIG. 3, troubleshooting console 136 includes a parameter display 332 indicating the number of connections to database "DB1" at the time of the fault event. Parameter display 332 may be based on data collected in FTA data store 125, as described above. Additionally, troubleshooting console 136 may display data parameters useful in determining a suitable time for executing a corrective action. For example, such data parameters may include a number of jobs scheduled to be executed at a certain time, a current number of users connected to the database, and the like.

In one embodiment, troubleshooting console 136 may be configured to present the user with recommended commands to execute corrective actions based on FTA data. Further, troubleshooting console 136 may be configured to receive any commands selected by a user, and to perform the selected actions. For example, as illustrated in FIG. 3, troubleshooting console 136 includes a user command 334 which performs a corrective action, namely to increase the number of allowed connections on the database experiencing the fault event. Such commands presented in troubleshooting console 136 may be specified in FTA metadata 124, and may be presented as graphical elements (i.e., controls) such as hyperlinks, buttons, menus, and the like. Troubleshooting console 136 may be further configured to present the user with the results of the completed actions.

In one embodiment, troubleshooting console 136 may be further configured to enable user editing of the underlying FTA data. For example, troubleshooting console 136 may enable user editing (e.g., "Wiki"-style functionality) of the displayed content, thus resulting in changes to the underlying data. Depending on the configuration of management server 120, the updated data may be stored in FTA metadata 124 and/or FTA data store 125. Additionally, troubleshooting console 136 may be configured to receive and display user notations, such as comment, tips, etc. Such notations may be stored, for example, in the community FTA data store 150.

Of course, troubleshooting console 136 is provided for illustrative purposes only, and is not intended to be limiting of the invention. Other embodiments are also contemplated. For example, troubleshooting console 136 may also present content from sources other than those described above, such as external web pages, XML databases, text document, and the like.

Figure 4:
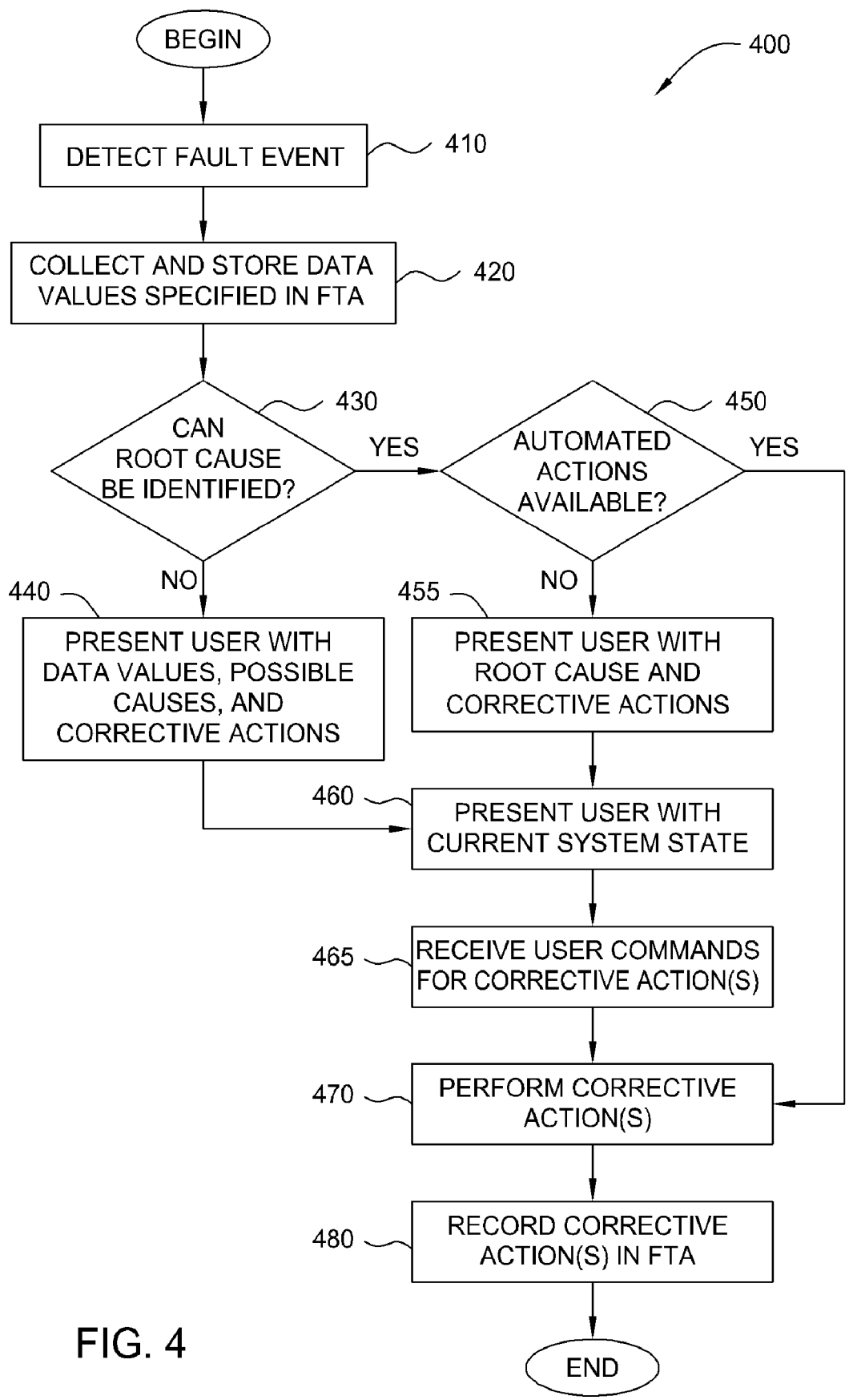
FIG. 4 illustrates a method for troubleshooting computer systems using a fault tree analysis, according to one embodiment of the invention.

FIG. 4 illustrates a method 400 for troubleshooting computer systems using fault tree analysis, according to one embodiment of the invention. Persons skilled in the art will understand that, even though the method is described in conjunction with the system of FIG. 1, any system configured to perform the steps of method 400, in any order, is within the scope of the present invention.

As shown, method 400 begins at step 410, where a fault event is detected. For example, fault monitor 132 may receive a data signal from monitoring agent 109 which indicates that a fault occurred in application 108. Such a data signals may include, e.g., a threshold value, event flag or exception thrown by application 108. At step 420, data values may be collected and stored according to a fault tree analysis. Further as described above, the data values may be collected (or received) from a monitored system. For example, assuming FTA metadata 124 includes the fault tree 200 shown in FIG. 2, then step 420 may include the collection and storage of the value of the "AUTOCOMMIT" parameter included in the fault tree 200. Such data values may be stored, for example, in the FTA data store 125 shown in FIG. 1.

At step 430, it is determined whether the root cause of the fault event can be identified. That is, whether the fault tree can be evaluated with the data values stored in step 420, identifying one or more potential root causes for the fault event. Step 430 may be performed, for example, by parsing the FTA metadata 124 with FTA parser 134, and evaluating any included parameters with the data values stored in FTA data store 125, as illustrated in FIG. 1. If the root cause cannot be identified, then at step 440, the user may be presented with the data values stored at stored at step 420, as well as possible causes and actions stored in FTA data. For example, the user may use the troubleshooting console 136 to view data values stored in FTA data store 125, and well as causes/actions parsed from the FTA metadata 124. The method 400 then continues at step 460.

On the other hand, if it is determined at step 430 that a root cause can be identified, then at step 450, where it is determined whether an automated corrective action is available. For example, the fault monitor 132 may determine whether a corrective action is specified in the fault tree based on the detected fault condition and the appropriate monitored parameters. Further, fault monitor 132 may determine whether the corrective action can be performed automatically (i.e., without user intervention). If an automated corrective action is available, such corrective auction may be performed at step 470. However, if an automated corrective action is not available, then at step 455, the user may be presented with the root cause identified at step 430, as well as any possible corrective actions specified in FTA data. For example, the user may use the troubleshooting console 136 to view a root cause and corrective actions parsed from the FTA metadata 124 by FTA parser 134.

At step 460, the user may be presented with data parameters indicating the current state of the system experiencing the fault event. Such data parameters may be used, e.g., to determine a suitable time to execute a corrective action, while minimizing any adverse impact to the system or its users. Step 460 may be performed, e.g., by presenting the data parameters to the user in troubleshooting console 136. At step 465, the user may receive an indication of the appropriate user commands or actions for performing corrective actions in order to resolve the fault condition. For example, the user may select user command 334 in troubleshooting console 136, as shown in FIG. 3. At step 470, any corrective actions may be performed. The corrective actions performed at step 470 may include actions selected by the user at step 465, or may include any automated actions determined at step 450. At step 480, the corrective actions performed at step 470 may be recorded in FTA data. For example, corrective actions may be stored in FTA data store 125. Such records of corrective actions may be used, e.g., in determining corrective actions for future fault events. Optionally, corrective actions may also be stored in a community FTA data store 150, so as to assist other members of the community in determining corrective actions to similar fault events. After step 480, the method 400 terminates.

Advantageously, embodiments of the invention provide troubleshooting of computer systems using fault tree analysis. Currently, troubleshooting computer systems may be difficult and time-consuming. By capturing expert knowledge in FTA metadata and by enabling collaborative sharing of such FTA metadata, embodiments of the invention improve the ability of system administrators to troubleshoot computer systems.

While the foregoing is directed to embodiments of the present invention, other and further embodiments of the invention may be devised without departing from the basic scope thereof, and the scope thereof is determined by the claims that follow.

What is claimed is:

1. A computer-implemented method for troubleshooting a computer system, comprising:
   retrieving a data structure storing a fault tree analysis describing a fault event detected in the computing system, wherein the fault tree analysis specifies a hierarchical structure specifying one or more symptoms associated with the fault event and one or more root causes associated with the fault event;
   retrieving metadata characterizing the fault event, wherein the metadata is supplied by a user-community; and
   predicting, based on an evaluation of the fault tree analysis and the metadata, a root cause for the fault event.

2. The computer-implemented method of claim 1, further comprising, retrieving one or more data values describing an operational status of the computer system at the time of the fault event.

3. The computer-implemented method of claim 1, wherein the fault tree analysis is formatted using at least one of the XML, DITA, and HTML data formats.

4. The computer-implemented method of claim 1, further comprising:
   presenting, within a user interface, at least one selectable action to correct the predicted root cause;
   receiving a user selection of one of the at least one selectable action; and
   performing the selected action.

5. The computer-implemented method of claim 4, further comprising, storing the performed action as additional metadata for future use by the user-community in troubleshooting the fault event.

6. The computer-implemented method of claim 1, further comprising:
   determining an action to correct the predicted root cause; and
   performing the determined action.

7. The computer-implemented method of claim 1, further comprising:
   receiving, within the user interface, one or more user modifications to the fault tree analysis; and
   storing the one or more user modifications as additional metadata in the fault tree analysis for future use by the user-community in troubleshooting the fault event.

8. A computer useable storage medium having a computer readable program, wherein the computer readable program when executed on a computer causes the computer to perform an operation, comprising:
   retrieving a data structure storing a fault tree analysis describing a fault event detected in the computing system, wherein the fault tree analysis specifies a hierarchical structure specifying one or more symptoms associated with the fault event and one or more root causes associated with the fault event;
   retrieving metadata characterizing the fault event, wherein the metadata is supplied by a user-community; and
   predicting, based on an evaluation of the fault tree analysis and the metadata, a root cause for the fault event.

9. The computer useable storage medium of claim 8, wherein the operation further comprises, retrieving one or more data values describing an operational status of the computer system at the time of the fault event.

10. The computer useable storage medium of claim 8, wherein the fault tree analysis is formatted using at least one of the XML, DITA, and HTML data formats.

11. The computer useable storage medium of claim 8, wherein the operation further comprises:
    presenting, within a user interface, at least one selectable action to correct the predicted root cause;
    receiving a user selection of one of the at least one selectable action; and
    performing the selected action.

12. The computer useable storage medium of claim 11, wherein the operation further comprises, storing the performed action as additional metadata for future use by the user-community in troubleshooting the fault event.

13. The computer useable storage medium of claim 8, wherein the operation further comprises:
    determining an action to correct the predicted root cause; and
    performing the determined action.

14. The computer useable storage medium of claim 8, wherein the operation further comprises:
    receiving, within the user interface, one or more user modifications to the fault tree analysis; and
    storing the one or more user modifications as additional metadata in the fault tree analysis for future use by the user-community in troubleshooting the fault event.

15. A system, comprising:
    a processor; and
    a memory containing a monitoring program configured to monitor the availability of a networked software application, wherein the monitoring program, when executed on the processor, is configured to:
       retrieve a data structure storing a fault tree analysis describing a fault event detected in the computing system, wherein the fault tree analysis specifies a hierarchical structure specifying one or more symptoms associated with the fault event and one or more root causes associated with the fault event
       retrieve metadata characterizing the fault event, wherein the metadata is supplied by a user-community; and
       predict, based on an evaluation of the fault tree analysis and the metadata, a root cause for the fault event.

16. The system of claim 15, wherein the monitoring program is further configured to retrieve one or more data values describing an operational status of the computer system at the time of the fault event.

17. The system of claim 15, wherein the fault tree analysis is formatted using at least one of the XML, DITA, and HTML data formats.

18. The system of claim 15, wherein the monitoring program is further configured to:
presenting, within a user interface, at least one selectable action to correct the predicted root cause;
receive a user selection of one of the at least one selectable action; and
perform the selected action.

19. The system of claim 18, wherein the monitoring program is further configured to store the performed action as additional metadata for future use by the user-community in troubleshooting the fault event.

20. The system of claim 15, wherein the monitoring program is further configured to:
determine an action to correct the predicted root cause; and
perform the determined action.

21. The system of claim 15, wherein the monitoring program is further configured to:
receive, within the user interface, one or more user modifications to the fault tree analysis; and
store the one or more user modifications as additional metadata in the fault tree analysis for future use by the user-community in troubleshooting the fault event.

* * * * *